United States Patent [19]

Provasoli

[11] Patent Number: 5,127,610
[45] Date of Patent: Jul. 7, 1992

[54] LIFT BACK SPINE PROTECTOR

[76] Inventor: Richard Provasoli, 9 Garden Way, Larkspur, Calif. 94939

[21] Appl. No.: 612,821

[22] Filed: Nov. 14, 1990

[51] Int. Cl.$^5$ .................. B64D 17/30; A41D 13/00
[52] U.S. Cl. ............................. 244/151 R; 2/44
[58] Field of Search ............ 244/151 R, 151 A, 900, 244/148; 54/66; 128/870, 78; 2/44, 2

[56] References Cited

U.S. PATENT DOCUMENTS

| | | | |
|---|---|---|---|
| 4,397,046 | 8/1983 | Steiner | 2/44 |
| 4,757,554 | 7/1988 | Blair | 2/44 X |
| 4,820,221 | 4/1989 | Aubrey | 128/78 X |
| 4,884,295 | 12/1989 | Cox | 2/44 X |

Primary Examiner—Joseph F. Peters, Jr.
Assistant Examiner—Carla Mattix

[57] ABSTRACT

The "Lift Back" is an invention for providing spinal protection with an impact resistant moldable material for insertion in a fabric harness in sport aviation particularly Paragliding. The invention is comprised of two main parts which are fastened together and in union provides relief to the low back, rib cage and shoulders from the stress put on the body while the pilot operates his Paraglider, and most importantly provides spinal protection to the pilot's spinal column in the event of impact.

1 Claim, 2 Drawing Sheets

LIFT BACK SPINE PROTECTOR

BACKGROUND

1. Field Of Invention

This invention relates to the sport of aviation, particularly non-powered parachutes, specifically called Paragliders. The pilot sits in a fabric harness, my invention is a molded form to protect the spine from impact injury and support the back and ribs from fatigue and stress.

2. Description of Prior Art

Heretofore pilots of Paragliders have occasionaly used motorcycle braces with flexible plastic segments to protect the spine from impact injury. This is ineffective because it is inconvenient to wear under the pilot's clothes and offers no support for the pilot's back and ribs. A small number of pilots wear a fabric weight lifter's belt to support the muscles of the low back. This sport was invented only four years ago in Europe in 1986. I have researched all six major magazine publications in this sport with no evidence of any device providing rigid spinal protection and back, trunk and rib support which my invention provides. I have further researched this with the four leading pilots of Paragliders in the western U.S. who have competed internationally and they have reported no evidence of a device similar to my invention. A manufacturer of Paragliding harnesses, Mr. Jim Yates, owner of Summit Magic, 1600 E Cypress #8, Redding Ca. 96002, also has seen no evidence in the U.S.A. or abroad of any device similar to my invention. A trademark search for "Lift Back" was conducted professionally by Mr. Peter Gaczi of San Francisco Calif. with no prior art conflict.

OBJECTS AND ADVANTAGES

Accordingly I claim the following as my objects and advantages of the invention:

to provide an important piece of safety equipment for persons launching a Paraglider non-powered parachute which can ascend to altitudes of fifteen thousand feet. As of Nov. 1990 only one death has occurred in this new sport in the U.S.A. and was due to a pilot being harshly blown onto a rock cliff from where he had launched. He was wearing a helmet but had he been using a Lift Back spine protector, he may have survived. In Europe there are currently sixty thousand registered Paraglider pilots. Dozens of deaths that have already occurred may have been prevented by using a Lift Back spine protector inside their harness.

In addition I claim the following objects and advantages: to provide relief on the pilot's shoulders, ribs and low back from the pressure of suspension in a fabric harness for hours at a time. As a Doctor of Chiropractic and a Paraglider pilot, I devised a means to protect the spine from impact injury as well as provide support to relieve the shoulders, ribs and low back from the above described pressures on the pilot's upper trunk.

Readers will find further objects and advantages of the invention from a consideration of the ensuing description and the accompanying drawings.

DRAWING FIGURES

Figures 1, 2:
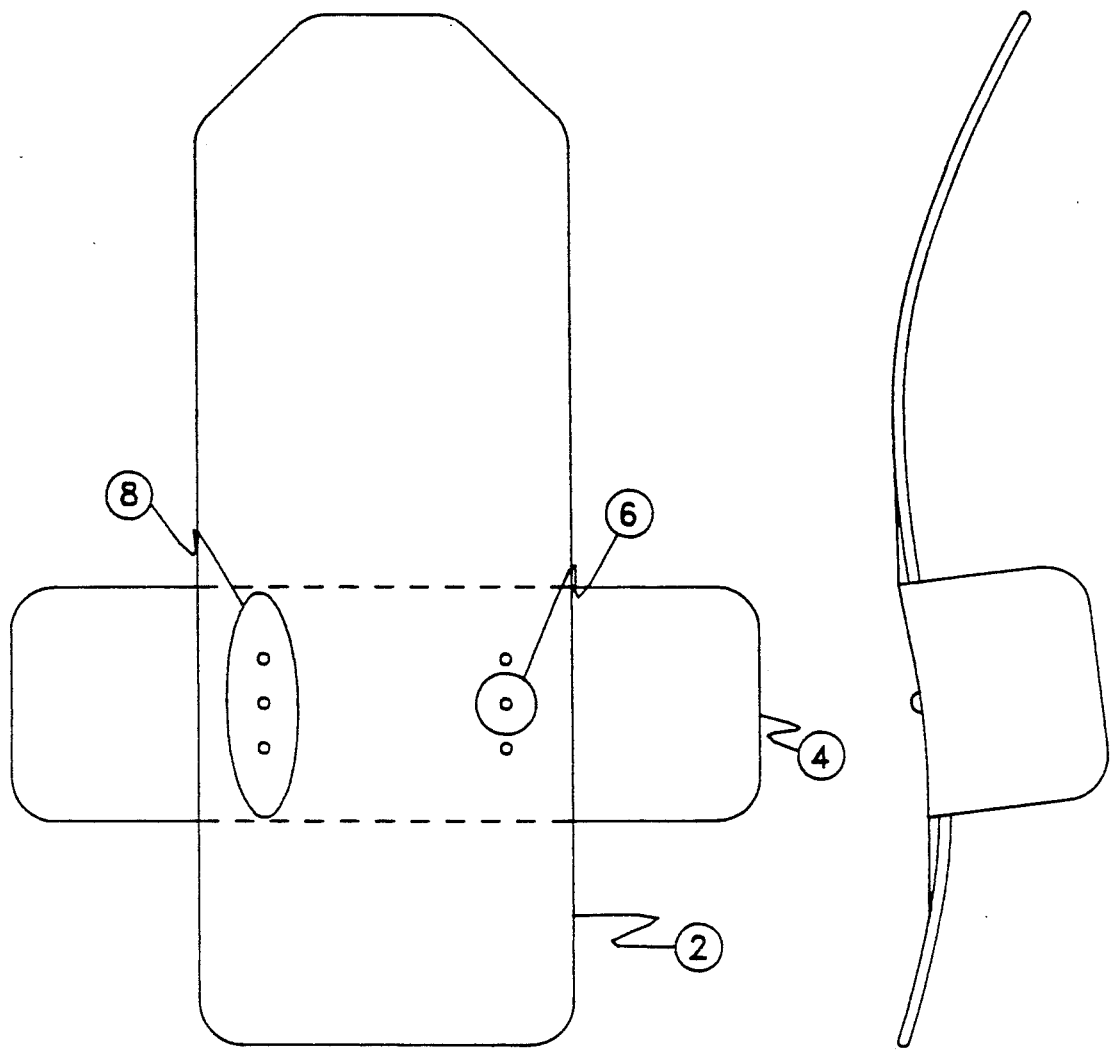
FIG. 1 shows a front view of the invention "Lift Back"
FIG. 2 shows a side view of such article
Figure 3:
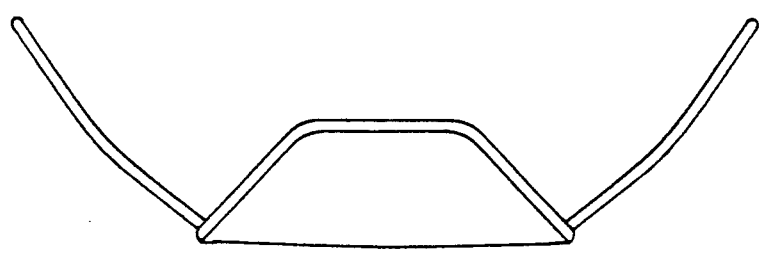
FIG. 3 shows a top view of such article
Figure 4:
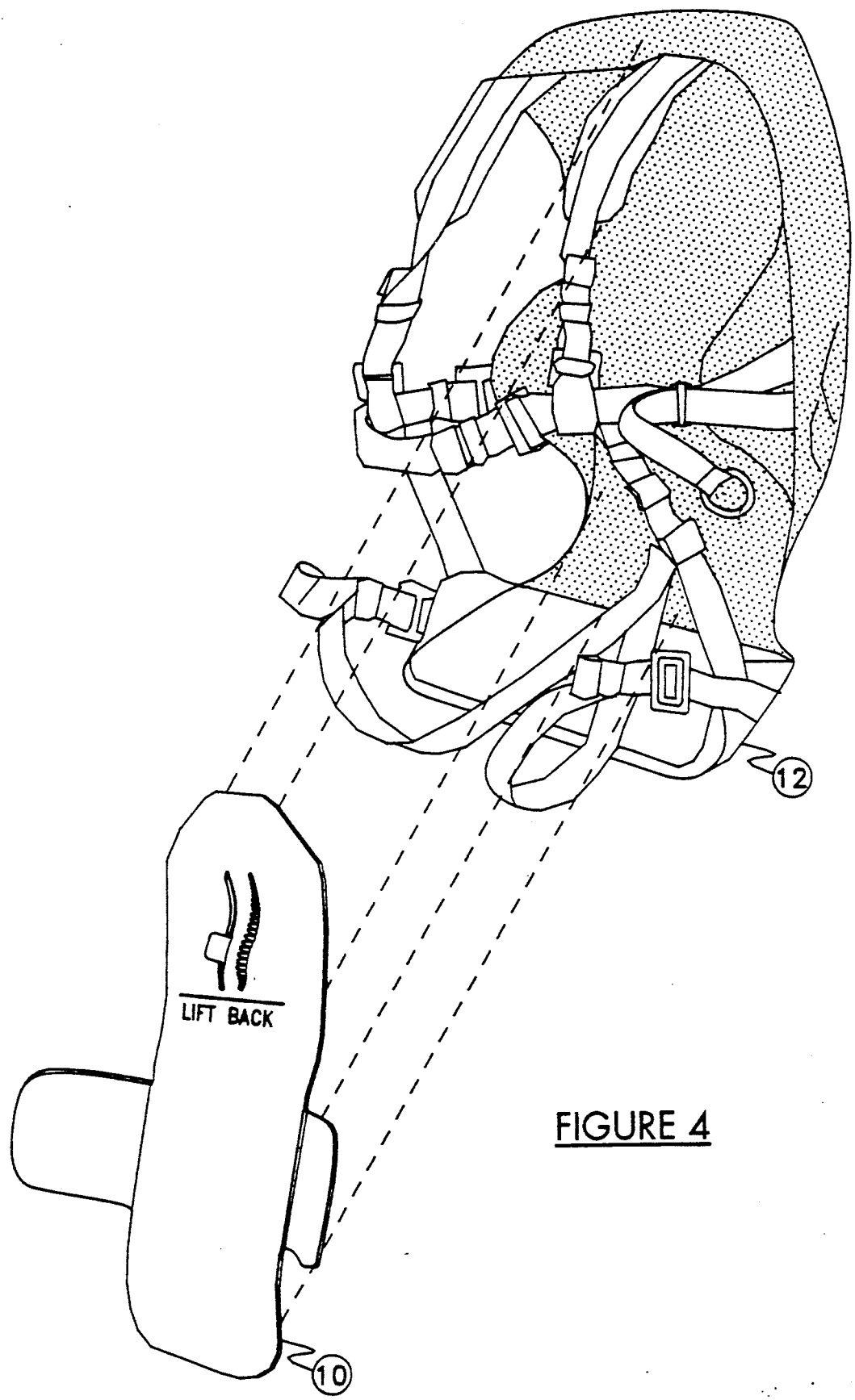
FIG. 4 shows a perspective front view of "Lift Back" 10 and illustrates its placement in a fabric Paraglider harness 12.

DRAWING REFERENCE NUMERALS 2 vertical piece
4 horizontal or transverse piece
6 mechanical fastener
8 adjusting holes in vertical piece 2
10 "Lift Back" spine protector
12 Paragliding fabric harness.

DESCRIPTION

FIG. 1 shows the "Lift Back" spine protector according to the preferred embodiment of the invention. The "Lift Back" spine protector comprises a vertical piece 2 approximately four inches wide and approximately twenty four to thirty inches long. It is constructed of one quarter inch thick microcellular foam polyvinylchloride also known as "Cintra" or "Tetapor". This vertical piece 2 has six holes 8 drilled through it to provide for adjustable placement of horizontal piece 4 which assures precise fit to pilot's body. This horizontal piece 4 is constructed of the same material as vertical piece 2 and measures approximately twenty inches long by approximately four inches wide. It is attached to vertical piece 2 by mechanical fastener 6 such as a screw with disappearing nut or a version of the Chicago Post. Both pieces 2 and 4 are covered with one quarter inch dense foam and covered again by a custom sewn fabric cover with full length zipper access at rear of each piece. The horizontal piece 10 fabric cover has Velcro tm hooks and loops sewn onto rear side to provide attachment to inside surface of fabric harness 12 which the Paraglider pilot sits in.

Operation

The "Lift Back" spine protector 10 as seen in sheet 2 is used in a very simple manner whereby the invention is attached by any means, in this case using Velcro tm hooks and loops, to the interior of a fabric harness 12 where the Paraglider pilot sits. As seen in FIG. 1 the horizontal piece 4 is fastened by mechanical means and is adjustable by moving it up and down the vertical piece 2 and refastening it through holes 8. This offers a very precise fit to the pilot's body as it adjusts to the straps of the harness 12 and provides relief from the fatigue and pressure on ribs from these said straps which supports the pilot while in flight. The material, microcellular foam PVC, can be molded by use of a household hair dryer to any shape to improve fit and contour to pilot's body. This provides maximum support and protection to pilot's spine from impact injury.

While the above description contains many specifications, the readers should not construe these as limitations on the scope of the invention, but merely as exemplifications of preferred embodiments thereof. Those skilled in the art will envision many other possible variations are within its scope. For example, skilled artisans will readily be able to change the dimensions and materials. They can make many variations on the adjustment capabilities so as to even use the invention as a back support for a car seat. Accordingly the reader is requested to determine the scope of the invention by the appended claims and their legal equivalents, and not by the examples which have been given.

I claim:

1. A protective device for use in a paragliding harness to protect a pilot's spine from impact injury and support the back and ribs of a pilot, the device comprising:
   a vertical piece having a moulded length and width conforming to the contour of the pilot's spine and back;
   a horizontal piece connected to said vertical piece in a region where said horizontal piece acts to support the means adapted to vertically adjust the horizontal piece to provide a precise fit to the pilot's body;
   means for removably attaching the protective device to the harness.

* * * * *